Jan. 19, 1943.   C. F. SISK ET AL   2,308,836
METERING DEVICE AND COIN SELECTOR
Filed March 25, 1939   5 Sheets-Sheet 5

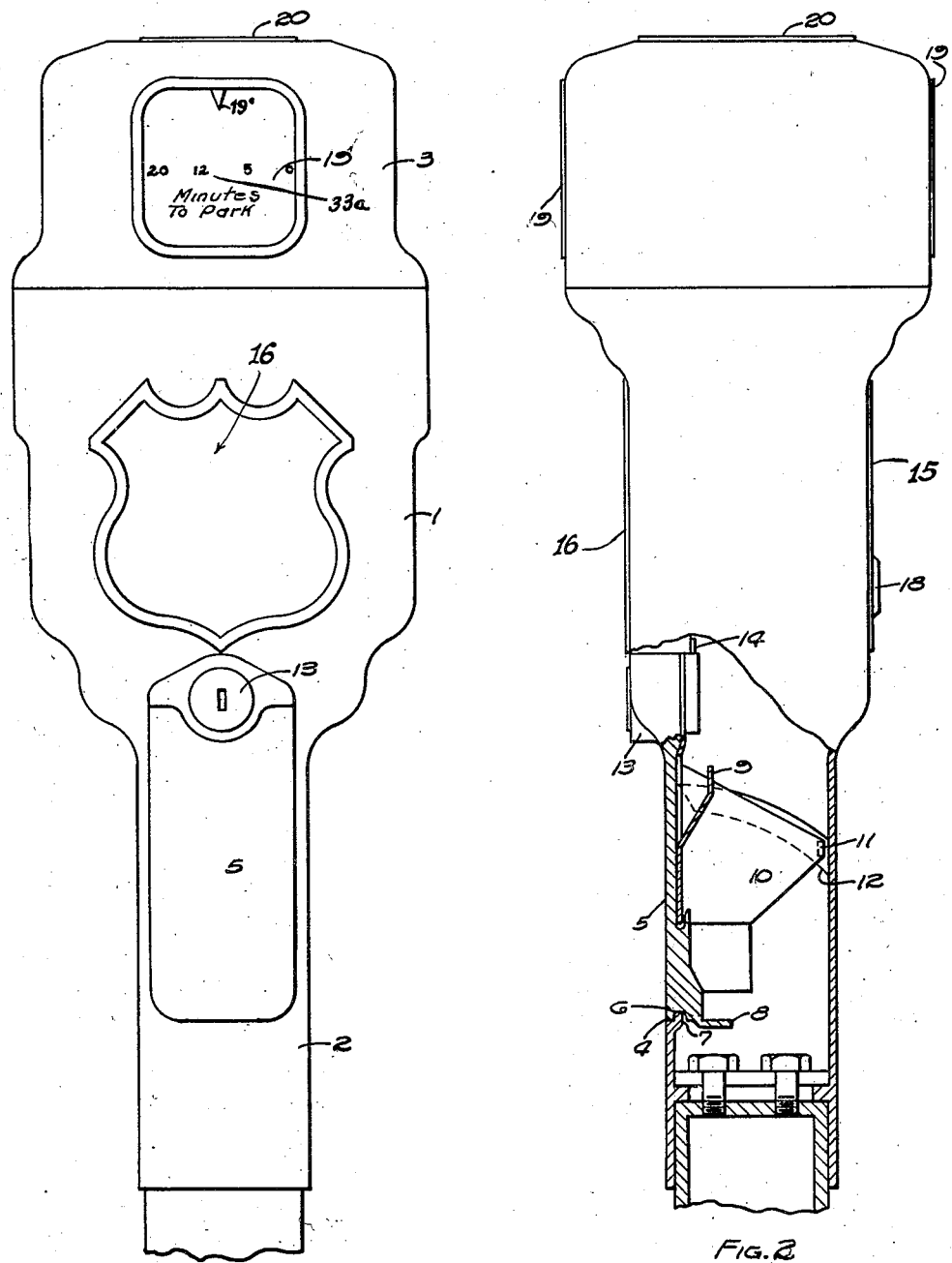

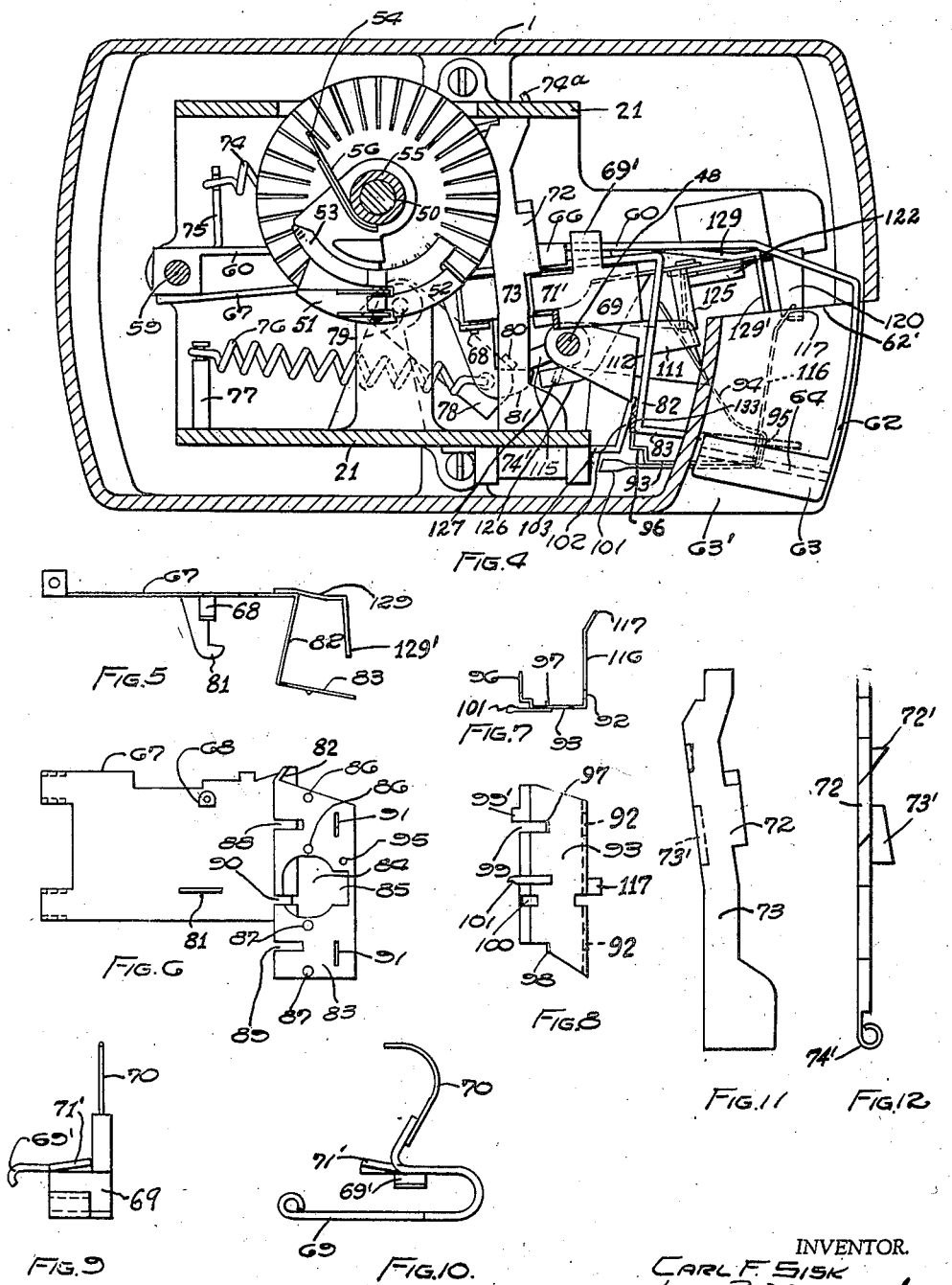

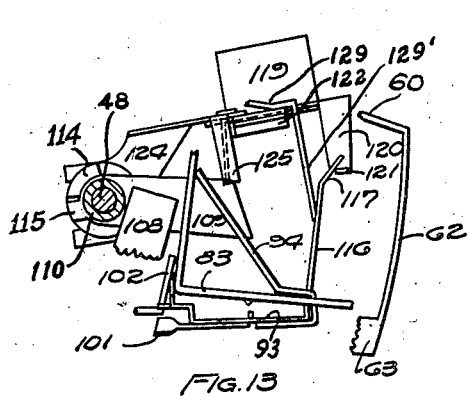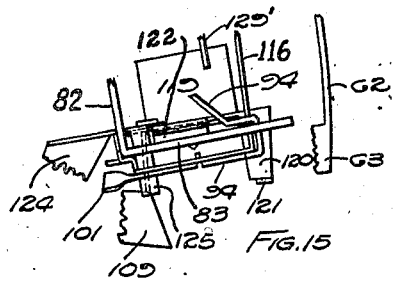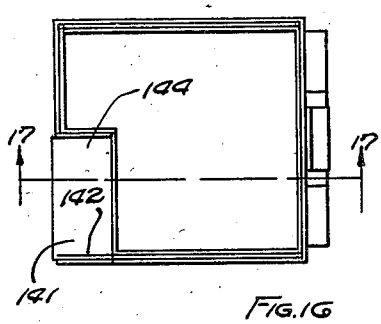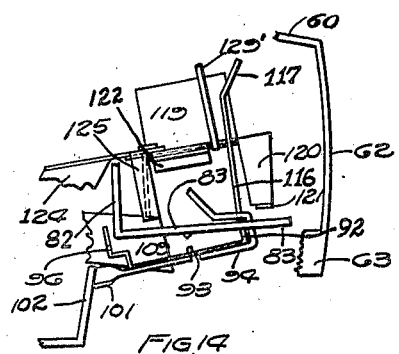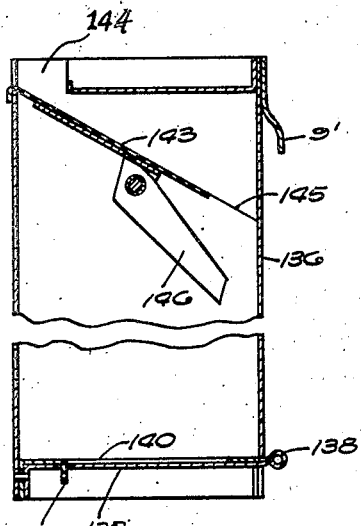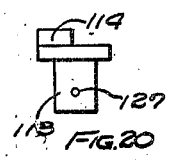

INVENTOR
CARL F. SISK
JOHN B. MORTON, Jr.
BY
John D. McLean
ATTORNEY

Patented Jan. 19, 1943

2,308,836

UNITED STATES PATENT OFFICE 2,308,836

METERING DEVICE AND COIN SELECTOR

Carl F. Sisk and John B. Morton, Jr., Dayton, Ohio, assignors to The American Traffic Register Company, Dayton, Ohio, a company of Ohio Application March 25, 1939, Serial No. 264,186

15 Claims. (Cl. 194—83)

This invention relates to improvements in metering devices of the coin operated type and has for its object to provide a metering device in which there are instrumentalities for selecting out slugs, washers and discharging them through an opening for that purpose.

It is also an object of this invention to provide a coin operated metering device in which there are travelling coin selecting instrumentalities which receive coins at different points and discharge them at a predetermined point.

It is also an object of this invention to provide a traveling instrumentality for receiving a coin at a definite point and thereafter discharging the coin into an adjustable coin selecting instrumentality at another point.

It is also an object of this invention to provide a coin selecting instrumentality moveable to a point to receive the coin and thereafter automatically return to its initial position for discharging the coin.

It is also an object of this invention to provide a moveable outside coin selector which discharges the coin at a predetermined point in its movement into an inside coin selector, which latter selector moves from a coin receiving position to a coin discharging position and in so doing operates an indicating device.

It is also an object of this invention to provide a metering device having a casing with display windows, an indicator and reflectors, with the reflectors so arranged with relation to the windows and the indicator that light from outside sources illuminates the indicator.

It is also an object of this invention to provide a time metering device in which there is a power spring and a moveable outside coin selecting instrumentality so connected with said spring that it will wind the spring to produce a certain tension and thereafter will be inoperative to further wind the spring until the tension thereon has been reduced.

It is also an object of this invention to provide a time metering device in which there is a power spring, an outside coin selecting device, a connection between the outside selecting device and the spring for winding the spring up, and a connection between the outside selecting device and the spring whereby the connection between the outside selecting device and the spring is broken and so maintained until the spring has been reduced in tension.

It is also an object of this invention to provide a vending machine in which there is a power spring, a winding member and a connection between the spring and the winding member whereby the spring is wound to a definite tension and after the spring has reached said tension the connection between the winding member and the spring is broken so that any further movement of the winding member has no tendency to wind the spring until the tension thereof has been reduced to a definite point, said reduction of tension always being independent of any action of the winding member.

It is also an object of this invention to provide a vending device in which there is a moveable selector for separating coins from slugs, washers and tokens by outside diameter and thickness, by center solidarity and thickness, by weight and by contour of the faces of the coins as distinguished from surfaces of slugs, washers and tokens.

It is an object of this invention to provide a moveable outside coin selector which discharges the coin at a predetermined point in its movement into an inside coin selector which latter selector automatically moves from a coin receiving position to a coin discharging position and in so moving operates a vending instrumentality.

It is also an object of this invention to provide an outside moveable coin selector and an inside coin selector moveable by the outside coin selector, which inside coin selector at a certain point in the movement of the coin selectors receives the coin from the outside coin selector and immediately thereafter is released whereby it automatically moves to its initial position independent of the outside coin selector and in moving to its initial position it operates a vending instrumentality.

It is also an object of this invention to provide a parking meter operated to show or indicate a free parking time and at least two other parking times of different durations, obtained by depositing coins of different denominations. It is also an object of this invention to provide a metering device having an instrumentality for receiving coins of different denominations and instrumentalities operated selectively by the coins for vending different services.

Figure 1 is a rear elevation of a complete vending machine showing one observing window, one escutcheon and a coin box holding closure.

Figure 2 is a view looking toward the right hand side of Figure 1 with the lower part in section to show the coin box holding lug.

Figure 4 is a horizontal section taken on an irregular line to show various elements of the operating mechanism.

Figure 5 is a top plan view of a selector arm.

Figure 6 is a side elevation of the selector arm shown in Figure 5.

Figure 7 is a top plan view of a selector plate which cooperates with the selector arm shown in Figures 5 and 6.

Figure 8 is a side elevation of the plate shown in Figure 7.

Figure 9 is an end view of a latch and a clock starting mechanism.

Figure 10 is a view of the latch and clock starting mechanism taken from the left hand side of Figure 9.

Figure 11 is a top plan view of a control plate for releasing the latch shown in Figures 9 and 10.

Figure 12 is a view of the control plate shown in Figure 11 taken from the right hand side thereof.

Figure 13 is a view showing the interior coin selecting instrumentalities in which the coin selecting parts are in their initial and coin discharging positions.

Figure 14 is a view similar to Figure 13 but with the parts in the position intermediate between the coin discharging and coin receiving position. In this figure the operating arms are shown intermediate their forward positions and their rearward positions.

Figure 15 shows the interior coin selector with the parts in the coin receiving position. The operating arms are in their rearward positions.

Figure 16 is a top plan view of a coin box adapted to receive the coin after it has been discharged from the selector from the position as shown in Figure 13.

Figure 17 is a vertical section through the coin box on the line 17—17 of Figure 16 partly broken away.

Figure 18 shows a front elevation of a slug holding mechanism.

Figure 19 is a view similar to Figure 18, but with the parts in a slightly varied position for dropping the slug.

Figure 20 shows in side elevation a sleeve with a stop and cam means thereon.

Figure 21 is a top plan view of the sleeve shown in Figure 20.

Figure 3:
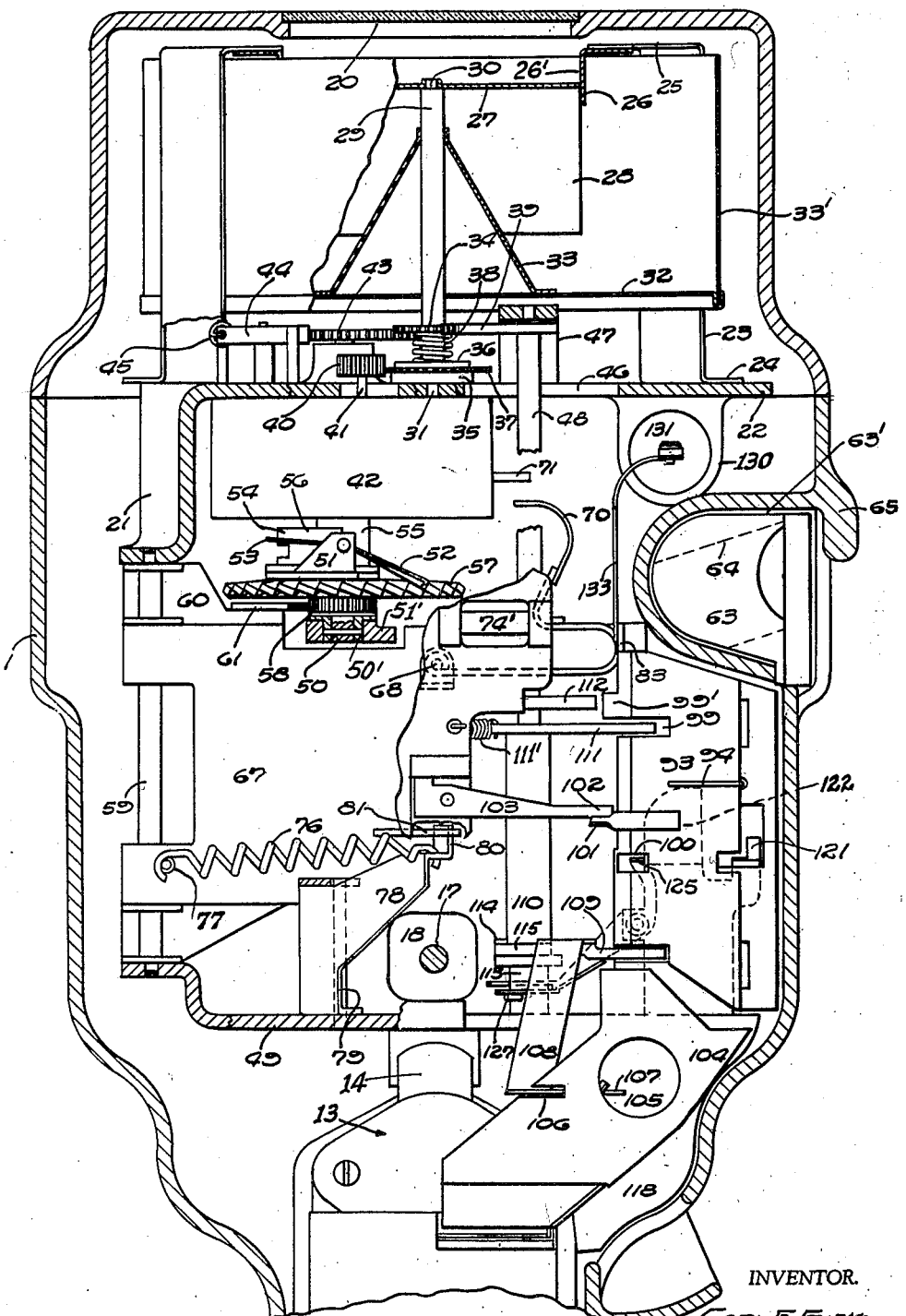
Figure 3 is a section cut through various parts to show as much of the mechanism as possible. Section does not follow a straight line.
Figure 23:
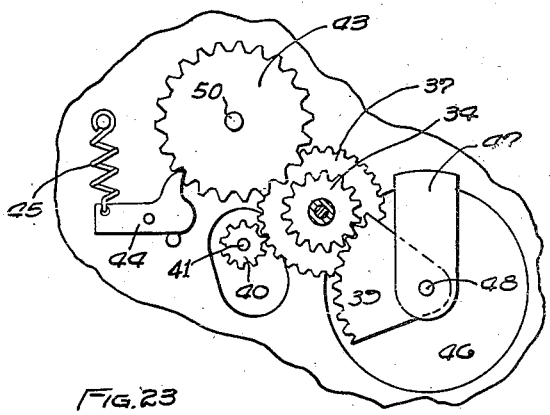
Figure 23 is a top plan view of the mechanism used for setting the indicator drum and also showing the holding mechanism used in winding the clock.

The operating parts of the present invention are enclosed within a case 1 which is made of any suitable material and has extended downwardly a hollow stem 2 which may be of any suitable form or shape, but preferably in square. This case has also, as forming a part thereof, a cap 3 attached to the main body 1 of the case by screws, or other suitable means. In the hollow stem is an opening 4 closed by a removable closure member 5 which has at its lower end a notch 6 to receive a projection 7 on the stem at the lower end of the opening 4. On the lower end of the closure 5 and extending inwardly with relation to the stem is a projection or shoe 8 which aids in the supporting of a coin box. At the upper end of the closure 5 is a catch member 9 adapted to be engaged by a cooperating catch member 9' on the coin box. At each lateral edge of the closure 5 is an inwardly extending resilient side plate 10, on the outer side of which at the inner edge thereof is a lug 11. These lugs 11 ride in grooves 12 and eventually abut the vertical walls of the grooves around the opening 4 when the closure is tilted outwardly about the projection 7 as a pivot. These side plates form keepers for a coin box. At the upper end of the closure is a lock 13 which has a plunger 14 adapted to engage a cooperating member on the case for locking the closure in closed position. In the front and in the rear of the case is an opening. The front opening is closed by an escutcheon plate 15 while the rear opening is closed by an escutcheon plate 16. To the rear escutcheon plate one end of a bolt or rod 17 is attached. The other end of the rod is threaded to receive a lock 18 attached to the front escutcheon plate. By means of this bolt and lock these plates are firmly locked in the case so that the openings closed thereby are securely closed up. In the cap there are two lateral windows 19; one at the front, the other at the rear. Inside each window and visible through the window is a pointer 19' which in cooperation with numbers on a drum later described indicates the parking time. In the top of the cap is a window 20 which serves to admit light to an inverted V-shaped reflector 27 in the cap, by which the light is directed toward the lateral windows and through the translucent indicator dial or drum 33'.

Figure 24:
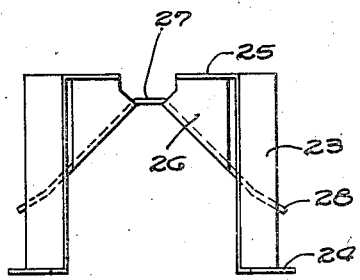
Figure 24 is a side elevation of the reflector and the supports therefore.
Figure 22:
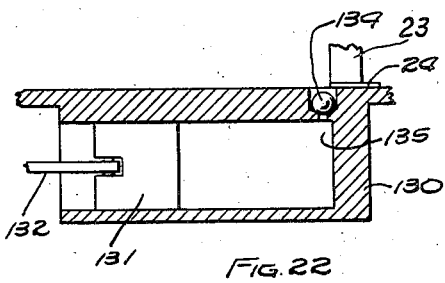
Figure 22 is a vertical longitudinal section through a dash pot which stabilizes and equalizes the movements of the coin selectors.

Within the case is a frame 21 which has a horizontal top or table part 22 which has mounted thereon a solid sheet metal member (see Figs. 3 and 24) formed to provide four posts 23, feet 24, by which the frame is attached to the table, inwardly extending arms 25, two downward extensions 26 on the arms, and the reflector 27 between the extensions 26. This reflector is immediately beneath the window 20 and is formed into two oppositely disposed wings 28, each of which is adjacent to one of the windows 19 and has at each end an upright reflecting surface 26' on one face of each of the extensions 26. The posts 23 are without the indicator drum 33'.

The apex of the reflector has a hole therein which receives the reduced end 30 of a shaft 29. The other end of this shaft 29 is reduced at 31 to fit into a bearing provided therefore in the top or table 22.

Around this shaft 29 is a spider like member 32 which has centrally thereof a plurality of upwardly extending and converging arms 33 united at their upper ends and securely fastened to the shaft 29 so that when the shaft rotates the spider will rotate. The outer periphery of the spider is circular in shape and has attached thereto the drum member 33' which surrounds the reflectors and is adapted to rotate. This drum is composed of any suitable translucent material and has numbers (such as 33a) thereon for indicating parking time in minutes or for any other desired purpose. Fixed to the shaft 29 and spaced from the table 22 is a pinion 34 for rotating the shaft, spider and drum to indicate parking time.

Securely fastened to the shaft 29 adjacent its pivot 31 is a friction disc 35 and between this disc and the pinion 34 is a second friction disc 36 which is loosely mounted upon the shaft and frictionally engages a gear wheel 37 which rests on the disc 35 and can rotate independent of the shaft 29. A spring 38 between the pinion 34 and the disc 36 presses on the disc 36. The gear wheel 37 can slip between the discs 35 and 36 when the drum is being set, yet there is sufficient friction for the clock mechanism to rotate the drum to non-parking position. The pinion 34 is engaged by a gear segment 39 on a shaft 48 for the purpose of setting the drum 33' to indicate parking time. In mesh with the gear 37 is a pinion 40 fixed on the upper end of a shaft 41 reversing the rotation of the drum to non-parking position after it is set. This pinion and shaft form part of the clock mechanism generally indicated by the numeral 42. On top of the table or part 22 is a holding mechanism comprising a ratchet wheel 43 and a pawl 44. This wheel and pawl serve as a holding mechanism when the clock spring is being wound. The pawl is held in engagement with the ratchet wheel by means of a spring 45. In the table is an assembly hole 46 about the size of a half-dollar adjacent which is a bracket 47 serving as a bearing for the upper end of the shaft 48, which extends through the hole 46 and is supported by bearing at its lower end in the bottom 49 of the frame 21.

The clock is wound by means of a vertically disposed winding shaft 50 which has rigidly attached to its upper end the ratchet wheel 43 held against reverse movement by means of the pawl 44. To this winding shaft 50 is attached one end of a clock actuating spring forming part of the clock mechanism indicated by the numeral 42. On the lower end of the shaft 50 is a bushing 50' rigidly attached thereto by any suitable means. This bushing 50' rests in a bearing provided therefor in a horizontal part 51' of the frame structure. Immediately above the bushing 50' and loosely mounted upon the shaft 50 is a winding pinion 58 engaged by a gear segment 61 rigidly mounted upon an outside selector or pressure arm 60 when the pressure arm is moved backward. Arm 60 is pivotally supported at one end by a vertical shaft 59 carried by the frame 21. Fixed to the pinion 58 is a ratchet or rosette wheel 57 also loosely mounted upon the shaft 50 immediately above the pinion 58. Secured to the shaft 50 immediately above the ratchet wheel 57 is an arm 51 which has pivotally mounted thereon a pawl 52 for engaging the teeth of the ratchet wheel 57, whereby the movement of arm 60 will cause the shaft 50 to rotate. A projection 53 on the pawl 52 extends at first upwardly then downwardly away from the pawl 52. This projection 53 fits between two pawl releasing prongs 54 formed at the outer ends of an arm 56 mounted on the lower end of the hollow operating shaft 55, which is attached to the other end of the clock actuating spring. The shaft surrounds the winding shaft 50 and is supported on the winding shaft 50 immediately above the arm 51. The pinion 58 and the wheel 57 are operated to wind the clock by the gear segment 61 on the arm 60. When the end of projection 53 engages a prong 54 due to the relative rotation of the shafts 50 and 55 the pawl 52 is raised free of the ratchet wheel 57, thereby preventing further winding of the clock. When the clock is run down the projection 53 is out of engagement with the prongs 54 so the pawl 52 will engage the ratchet wheel 57.

The pressure arm 60 extends out of the case through space provided therefor in one edge of a trough 63'. The outer end of the pressure arm is bent toward the front of the case as indicated by numeral 62. This part 62 is shaped on its outer face to conform to the shape of the case which has the indentation or trough 63' which is approximately one inch in depth and open at its rear end. Moveable in this trough is a head or thumb piece 63 which extends inwardly from the part 62 and has therein a slot 64 which forms by its diameter and thickness an outside or exterior coin selector. The coin is held in the slot 64 by the bottom of the trough until the coin reaches the open end 62' of the trough when the coin will fall into the inside coin selector. In order to protect the head and the associate parts thereof the case immediately above the trough is provided with an overhanging projection 65, which will protect the outside moving parts from the accumulation of snow, ice and other matter.

The head part in which the slot 64 is located serves as a thumb piece whereby the arm 60 is operated.

On the upper edge of the selector or pressure arm 60 is a projection 66, the purpose of which will be later described. On the vertical shaft 59 is pivoted at one end an inside selector or operating arm 67. This arm, shown in Figures 5 and 6 of the drawings, has on its front face on the support 68 a pivoted latch 69 provided with a hook 69' for engagement with the selector or pressure arm 60, so that when the arm 60 is moved back by pressure on the head 63 the inside selector or operating arm 67 is moved with it. On the latch 69 is a spring member 70 for engagement with the shaft of the balance wheel 71 for starting the clock and a cam member 71' for engagement with a cam projection 72 on a cross trigger 73 pivoted at one end to one side of the frame as indicated by the numeral 74' on Figures 3 and 4. The engagement of this cam member 71' with the cam projection 72 will on the backward movement of arm 67 raise the trigger 73 and will on the forward movement of the arm 67 raise latch 69 to start the clock and release the hook 69' from the pressure arm 60. The other end of this cross trigger moves up and down adjacent the side of the frame opposite its pivot. In the position shown in Figures 3 and 4 the latch hook 69' engages the outside selector or pressure arm 60 and the parts are in their initial or inoperative position, but when the arm 60 is moved back it carries with it the arm 67.

When the pressure arm and the operating arm are moved back the cam 71' on the latch 69 will travel under the cam projection 72 of the trigger 73 and raise the trigger 73 slightly, but before the pressure arm and the operating arm have reached the limit of their backward movements the cam 71' travels beyond the cam projection so that the trigger 73 will drop to its position of rest on arm 60. When the thumb is released from the head or thumb piece 63, the selector or pressure arm and the operating arm start on their forward movements due first to the operation of a spring 74 connected at one end to a post 75 on the arm 60 and at its other end to the frame at 74a. In their forward movements the cam 71' will ride over the projection 72, thereby raising the latch 69 and the spring 70 thereon whereby the spring 70 will engage the shaft of the balance wheel of the clock. This raising of the latch 69 also releases the latch hook 69' from the pressure arm 60 so that the two arms can move forward thereafter independent of each other, one under the force of spring 74 and the other under the force of spring 76. The spring 76 is attached at one end to a post 77 on the frame and at its other end to one end of a spring control arm 78 which is pivoted at its other end on a shaft 79 on the bottom of the frame. On the spring control arm 78 adjacent the spring 76 is a projection 80 which is engaged by a hook 81 on the arm 67. The spring 76, the control arm 78, the projection 80 and the hook 81 are the instrumentalities for bringing the arm 67 back to its initial position. After the two arms have been separated by the release of the hook 69', the projection 72' on the trigger 73 will engage the projection 66 on the arm 60 so that the arm 60 will be held still while the arm 67 will move back to its initial position. As the arm 67 further moves to its initial position after the release of the hook 69' it will engage a cam 73' on the under surface of the trigger 73 so that the trigger 73 is again raised and thereby released from the projection 66 so that the arm 60 is free to complete its forward movement and free to assume its initial position after which the hook 69' will again engage the arm 60.

The operating arm 67 has a lateral extension 82 from which there is an extension 83 that extends substantially in the direction of the main body of the operating arm 67. This extension 83 is one part of a chute that forms an interior coin selector. This extension 83 has therein a round opening 84 for the purpose of discharging slugs and other unusable coins and discs. This opening 84 has an extension 85 in the direction of the free edge of the extension 83. Between the opening 84 and the upper edge of the extension 83 are two projections 86 spaced apart slightly less than the diameter of a nickel which serve as nickel coin selecting instrumentalities. Between the opening 84 and the lower edge of the extension 83 are two projections 87 similar in shape with extensions or projections 86 and spaced apart slightly less than the diameter of a penny. These projections 87 serve as penny coin selecting instrumentalities. In the extension 83 between the projections 86 is a slot 88 which extends across the elbow formed by the meeting of the parts 82 and 83 and through which a nickel setter arm 111 passes. Between the projections 87 is a slot 89 similar to slot 88 and similarly positioned with relation to the part 83 and through which the penny setter arm 109 passes. The part 82 adjacent the opening 84 has a slot 90 which extends from the part 83 to the main body of the operating arm 67 and through which a slug removing arm 125 will extend. In the extension 83 adjacent the outer edge thereof, are two slots 91, adapted to receive projections 92 on a selector plate 93 shown in Figures 7, 8 and 14. These projections 92 are in the slots 91, and the plate 93 is thereby pivotally supported on the extension 83 so that it may swing away from the extension 83 for releasing coins. For the purpose of holding the plate 93 against the extension 83, a spring 94, as partly shown in dotted lines in Figure 4, is used. This spring is substantially V-shaped and is supported on the extension 83 by passing through a hole 95. The outer arm of this spring 94 engages the outer surface of the plate 93 while its inner arm engages the extension 82 and is held by friction or the end may rest in a depression provided therefor. The plate 93 is somewhat in the shape of a trough, one edge of which has the projections 92 thereon; the other edge of the plate 93 forming a part of the trough structure is indicated by the numeral 96, and engages the surface of the extension 83 adjacent the extension 82 and the face of the extension 82 so that this plate 93 forms with the extension 83 a coin chute in which are the coin selecting projections 86 and 87. On the inner face of the plate 93 are two projections 97 and 98. One of these projections (projection 97) is opposite the slot 88 and between the projections 86. The other projection is on the lower end of the plate 93 at a point indicated by the numeral 98, and between the two projections 87 on the extension 83. When the plate 93 is adjacent to and parallel with the extension 83 the space between a vertical line through the ends of the projections 86 and 98 and a similar line through the ends of the projections 97 and 98 is less than the thickness of the coins used and the distance between the projections 87 is less than the diameter of a penny. The plate 93 is provided with a slot 99 which is in alignment with the slot 88 of the extension 83. This plate is also provided with a slot 100 which aligns with the slot 90. Extending from the outside face of the plate 93 is a small trip arm 101 adapted to engage a cam extension 102 of a pivoted arm 103. See Figure 3. This arm 103 is pivoted to one side of the frame and supported to have a limited amount of pivotal movement. The outer upper surface of the extension 101 is cam shaped so that as it moves forward or outward, it will engage, pass under and raise the arm 103 and the end of extension 101 is cam shaped so that when it is moved in the opposite or inward direction, it will engage the cam extension 102 of the arm 103 so that the plate 93 is moved away from the extension 83. When the plate 93 is moved away from the extension 83 the projection 99' is so positioned that it can pass a free time lever 112 without being in contact therewith. See Figure 3. In order to avoid engagement of the projection 99' with the setter arm 112 as the plate 93 moves backward the end of the extension 101 will engage the cam extension 102 to swing the plate 93 so that the projection 99' will pass clear of the setter arm 112. On reverse or forward movement of the plate 93 and the parts associated therewith after the extension 101 has passed beyond the cam extension 102 of the arm 103, the projection 99' will engage the setter arm 112 and rotate the shaft 48 sufficient to rotate the drum to indicate five minutes free parking time. In a coin receiving chute 104 below the selecting chute in its forward position is an observing hole or opening 105. Across the coin receiving chute at the lower edge of the opening 105 is a slot 106 adapted to receive the end 107 of an arm 108 which is attached to a lower penny setter arm 109. Whenever the end 107 is in the slot 106 the coin in the coin receiving chute is held therein, but when another coin is in a position to be discharged into the coin receiving chute, the lower end of this arm is removed by the coin engaging either arm 109 or arm 111 so that the coin in the coin receiving chute is discharged into a coin receiving box such as that shown in Figures 16 and 17. The penny setter arm 109 is located on the lower end of the tube or cylinder 110 that is supported upon the lower end of the shaft 48 and on the upper end of this tube or cylinder 110 is the nickel setter arm 111 adapted to pass through the slot 88 and the slot 99. A spring 111' fastened at one end to the frame and at another end to a projection on the arm 111 tends to rotate the tube 110 so that the arm 108 and the end 107 are so positioned that the end 107 will hold a coin in the chute 104. And immediately above the arm 111 rigidly attached to the shaft 48 is the free time setter arm 112. On the lower end of the shaft 48 just below the tube or cylinder 110 is a sleeve 113 which has thereon a stop 114 adapted to be engaged by a lug or projection 115 on the lower end of the tube or cylinder 110. See Figures 3 and 4. Extending rearwardly from the plate 93 is an arm 116 which has its outer end bent as shown at 117 of Figure 7.

The lower end of the frame has cast therewith a slug chute 118. To one side of this slug chute is attached the coin receiving chute 104. To the upper edge of this slug chute and opposite the coin receiving chute is a standard member 119 shown in Figures 18 and 19. This standard or plate 119 is attached to the bottom of the frame at one side of the slug chute in any suitable manner, preferably by soldering or welding. This plate has extending therefrom in the direction of the extension 83 a slug remover arm 120 which has extending upwardly therefrom a projection 121 adapted to be engaged by the end 117 of the arm 116 for the purpose of swinging the plate 93 away from the extension 83 so that a coin held between the two will drop into the coin receiving chute 104 directly beneath it when the arm 67 has returned to its forward or initial position. Extending upwardly from the standard 119 and slightly toward the extension 83, is a coin guide arm or plate 122 which is behind opening 84 in extension 83. Pivoted at 123 on the standard 119 is an arm 124 which has at one end a slug removing arm 125 and at its other end a fork member 126 adapted to fit around the sleeve 113. See Figure 18. These prongs are provided with a shoulder 126' adapted on rotation of a sleeve 113 to be engaged by a pin 127 for rocking the arm and thereby moving the arm 125 toward or away from the arm 120 mounted upon the standard 119 to permit slugs to drop through.

Extending longitudinally from the operating arm 67 is an arm 129 which has extending at right angles therefrom a slug removing finger 129', which is located adjacent the arm 120 and substantially parallel therewith, slightly above the upper surface of said arm 120, and pushes washers or slugs off arms 120 and 125 as the arm 67 is moved forward.

For the purpose of stabilizing, equalizing and retarding the movements of the arms and particularly for the purpose of avoiding a sudden return of the arms, there is provided a dash pot 130 which is formed integral with table 22. This dash pot is cylindrical in shape and forms a cylinder in which there is a reciprocating plunger or piston 131 to which one end of a piston rod 132 is attached. The other end of this piston rod is pivotally connected to an arm 133 rigidly attached in any suitable manner to the extension 82 of the operating arm 67. In order that the piston may have a free inward movement, there is provided at one end of the cylinder, a ball valve 134 which is adapted to close an outlet opening 135. This ball is prevented from removal from its seat by means of one of the feet 24 which extends slightly over the space provided for the ball. One end of the dash pot or cylinder is open, while the other is closed and the ball escape valve is located adjacent the closed end. There is sufficient clearance between the piston and the walls of the cylinder that air can escape past the piston.

In Figures 16 and 17, there is shown a rectangular coin box adapted to be supported on and by the closure 5. The body 136 of this coin box has extending from the upper end thereof and at one side the latch member 9' adapted to engage and cooperate with the latch member 9 located on the closure for holding the coin box in position on the closure. The bottom 137 is pivotally supported in the lower end of the box by means of a hinge 138. The edge of the bottom frictionally engages the side of the box so that it is held in closed position. This bottom is also held in position by means of a tongue or spring like projection 139 extending downwardly from a rectangular ledge member 140 at the lower end of the box. This tongue extends through a slot in the bottom. The top of the box adjacent one corner is provided with an opening 141 for receiving coins. Immediately beneath this opening is a chute which has a downwardly inclined bottom member 143 and two side members. One side member 142 is formed by one side of the box and the other side member 144 extends downwardly from the top of the box to the edge of the chute and between two oppositely disposed sides of the box.

The bottom of this chute stops short of one side at its lower end so that an opening 145 is provided for coins to pass through into the main body of the box. In order to prevent the coins from being removed from the box through the opening 145, there is pivoted to the lower surface of the bottom of the chute trap members 146.

The present invention is particularly well adapted for use as parking meters, and for that purpose it may be used for free time parking, penny time parking and nickel time parking. For the free time parking, the arms 60 and 67 are operated without the insertion of a coin. For penny parking, a penny is inserted into the slot 64 in the head 63 after which the arms 60 and 67 are pressed from their initial positions to the other end of the trough 63'. For parking a longer period of time, such as one hour, a nickel is placed into said slot and the arms are similarly pushed. In each of these operations, the indicator cylinder is rotated so that different numerals are disclosed through a window in the head.

The head or thumb piece 63 is pressed to its rearmost position and released, after which it returns back to its original position, as shown in Figure 4. This rearward thrust carries cam 101 along cam surface 102, keeping coin door or plate 93 in an open position, which causes free time setting point 99' to pass in the clear around free time setter arm 112. Upon releasing the thumb or finger from pressure arm head 63, spring 74 causes pressure arm 60 to return to initial position. Control arm spring 76 through control arm 78, projection 80 and hook 81 causes operating arm 67 to move likewise. In this movement, free time setter point 99' engages free time setter arm 112 rotating shaft 48, in turn gear segment 39, gear 34 and dial assembly. It is obvious that the position of free time setter arm 112 can give any required turn to the dial. This motion of setting the dial or drum is possible through the slip clutch and spring 38. The rearward thrust of the head above described also winds the clock. The backward movement of the head 63 causes the arm 60 and the segment 61 to move. The segment 61 in engagement with the pinion 58 causes the ratchet 57 to rotate from right to left (Figure 3) and when this ratchet is engaged by the pawl 52 the shaft 50 is rotated whereby the clock is wound. The winding operation continues until the arm 54 engages the projection 53 of the pawl 52, whereby the pawl 52 is released from the ratchet teeth of the ratchet wheel 57. When this is done the further rotation of the ratchet wheel 57 will not wind the clock.

The movement of the arms is more smoothly performed due to the action of the dash pot on the operating arm 67. After the two arms have returned to their initial positions, the clock mechanism 42 through gear 40 moves the dial in a timing motion.

There are two operations for coins, for example: pennies and nickel coins. A coin is inserted in slot 64 which is just behind the face of head 63 and with thumb or finger the head is pressed inwardly as above described. At the end of the travel of the pressure arm and at the inner end of trough 63', the penny falls out of the slot 64 down into the space between the extension 83 and the plate 93 to the lower points of the inside coin selector and is caught by the lower points 87 and 98 in the inside selector which is held and moved by operating arm 67. Pennies will pass by the points 86 because they are spaced too far apart to catch pennies. The pennies having passed points 86 will be caught by the points 87 and 98 and held in a position across the slot 89 so that as the extension 83 moves forward the penny will engage the arm 109 for rotating the shaft 48 to set the drum for penny parking time. The coin must fall behind and is stopped back of the penny setting arm 109 and the return motion caused by the springs 74 and 76 above described turns the sleeve 110 and lug 115 which engages stop 114 on collar 113 which is attached to shaft 48. This action sets the dial above described for penny parking period.

It is obvious that the dial can be set to any position determined by the arm. After this setting action takes place, the dial moves by means of the clock in a timing motion.

The larger nickel coin is placed in slot 64 in head 63, the hand pushes head 63 backwardly as above described. At the end of the thrust, the nickel coin drops into the inside selector and is caught by points 86 and 97 behind arm 111. The coin being moved forward by the action of the operating arm and spring engages and moves nickel setting arm 111, which turns sleeve 110 and shaft 48, setting the dial as above described for five cent parking period. Any desired movement of the dial may be obtained for the above described three sets by having the three setter arms 109, 111 and 112 in different angular positions with relation to each other.

Should a person insert a slug of slightly less diameter and thickness than the coin, the slug will fall through at the end of the insertion and be caught on the slug remover arms 125 and 120. As the operating arm 67 moves toward initial position, the slug remover arm 129 pushes the slug off the slug catcher arms and the slug drops through the hopper 118 to the outside of the case. Should a person insert a slug with a hole in it or a washer of the exact diameter and thickness of a nickel, it will pass inside selector points 86 and 97 because the latter point 97 due to the hole in the center of the washer or slug cannot press said washer or slug against points 86. Thus the slug or washer falls through to slug catcher points and falls through as above described.

Should a person insert a slug or chip smaller than a penny or a dime, for instance, these will pass by inside selector points 86 because the diameter of these being less than the distance between said points 86 cannot be held against point 97. The dime or small chip will then pass through nickel catcher points and likewise through the penny points 87.

Should a person after having inserted a nickel coin, which obviously should cause the largest setting movement of the dial, insert a penny, the penny will fall through the nickel selector points 86 and be caught by the slug remover arms due to the fact that a cam action on slug remover arm 125 has closed the gap between this arm and the other slug remover arm 120, thus the penny is removed the same as any slug.

The coin inserted after having set the dial as above described is caused to fall at the end of the setting motion of operating arm 67 due to the coin chute being open. This coin will fall into coin chute 104 and is held in front of the display window by means of arm 107. The free time motion above described has no effect on this arm 107.

The insertion of another coin will move arm 107 because it is attached to the penny setting arm which is likewise rigidly attached to sleeve 110 and nickel arm 111. This movement allows the coin in the display window or coin chute to fall into the coin box, this action taking place early in the movement of operating arm 67. At the end of the movement of operating arm 67, the coin which caused the action of the setter arm falls into the coin chute.

What we claim is:

1. In a vending machine, an indicating means, a clock for operating said indicating means, a coin selecting means, a connection between said coin selecting means and the clock whereby the clock may be wound, a second coin selecting means adapted to receive the coin from the first named selecting means and means operated by the coin deposited in the second named selecting means for setting the indicator means.

2. In a vending machine, an indicating means comprising an indicator and a clock for driving said means, a moveable coin selecting means, means connecting said selecting means to the clock for winding it, a second coin selecting means adapted to receive coins from the first selecting means, means on the second coin selecting means for starting the clock and means operated by the second named coin selecting means for setting the indicator.

3. In a vending machine, a casing having therein a trough-like depression and an opening into the case at the end of the depression, an arm pivotally mounted in the casing and having a coin selecting head in said trough, a second coin selector mounted in said case adapted to receive a coin from the first named coin selector and an indicator mechanism operated by the coin on the movement of the second named coin selector, said trough serving to prevent the coin from passing from the first coin selector into the second coin selector until the two coin selectors have a definite fixed position with relation to the indicator mechanism.

4. In a metering device, a case having therein a depression, said depression having at one end a passageway into the case, an arm pivoted at one end in said case and having on its other end a head with a coin receiving slot therein, said head being adapted to move in the trough and limited in its movement by the length of said trough, clock mechanism adapted to be wound by said arm, a second arm pivotally mounted at one end in said case and having on its other end a coin selecting means, means attaching the last named arm to the first named arm whereby the coin selecting means will move in unison from one end of the said trough to another, means to disengage said arms at the end of their movement and means operated in the process of disconnecting the two arms for starting the clock, said trough and said coin selector being so constructed that the coin will pass from the first coin selector to the second coin selector at the inner end of said trough.

5. In a metering device, a frame, an arm pivoted at one end to said frame and having at its other end coin selecting means, said coin selecting means comprising a plate integral with said arm and a second plate pivotally attached to the first named plate and moveable with relation thereto, means to move said second named plate with relation to the first named plate, the first named plate having a plurality of projections for trapping and holding coins, the second named pivotal plate having a plurality of projections cooperating with the first named projection for holding coins and means to cause said plates to be operated to discharge the coin.

6. In a metering device, an indicator, a shaft for operating said indicator, a moveable coin selecting means and means on the shaft engaged directly by and operated by the coin in the coin selecting means as the coin selecting means moves for rotating the shaft whereby the indicator may be set.

7. In a metering device, an indicator having a plurality of positions, means for setting the indicator, a coin selector having means thereon for selecting out one of a plurality of coins and means operated by said one of a plurality of coins in the coin selector for operating the indicator setting means whereby the indicator may be set at one of the plurality of positions.

8. In a vending machine, a pressure arm having therein a coin receiving slot, a selector arm having thereon a coin selecting means adapted to receive the coin from the slot, each arm having a forward and a rearward position, means to prevent the coin from passing from the slot to the selecting means until the arms are in their rearward positions, lock means to cause said arms to move together while the arms are moved from their forward positions to their rearward positions, means to cause both arms to move to their forward positions and means to release said lock means substantially upon the arms attaining their rearward positions whereby the two arms will move to their forward positions independently of each other and whereby any inadvertent movement of the pressure arm will not interfere with the movement of the selector arm and the action of the coin selecting means thereon.

9. In a vending machine, an indicating means, a clock for driving said means, a pressure arm having therein a coin receiving slot, a selector arm having thereon a coin selecting means adapted to receive the coin from the slot, each arm having a forward and a rearward position, means whereby the coin will pass from the slot to the selecting means when the arms are in their rearward positions, lock means to cause said arms to move together while the arms are moved from their forward positions to their rearward positions, means to cause both arms to move to their forward positions, means to release said lock means substantially upon the arms attaining their rearward positions whereby the two arms will move to their forward positions independent of each other and whereby any inadvertent movement of the pressure arm will not interfere with the movement of the selector arm and the action of the coin selecting means thereon, means operated by the rearward movement of the pressure arm for winding the clock, and means operated by the selector arm to set the indicating means.

10. In a vending machine, an indicating means, a clock for driving said means, a pressure arm having therein a coin receiving slot, a selector arm having thereon a coin selecting means, each arm having a forward and a rearward position, means whereby the coin will pass from the slot to the selecting means when the arms are in their rearward positions, lock means to cause said arms to move together while the arms are moved from their forward to their rearward positions, means to cause both arms to move to their forward positions, means to release said lock means substantially upon the arms attaining their rearward positions whereby the two arms will move to the forward positions independent of each other and whereby any inadvertent movement of the pressure arm will not interfere with the movement of the selector arm and the action of the coin selecting means thereon, means on said lock means to start the clock upon the release of the lock means, means on the pressure arm for winding said clock and means operated by a coin in the selecting means for setting the indicating means as the selector arm moves from its rearward position to its forward position.

11. In a vending machine, an indicating means, a clock for driving said means, a coin receiving member, a coin selecting member adapted to receive the coin from the receiving member, lock means to connect said members whereby they will move together, release means to release said lock means, means on the lock means as it is released to start the movement of the clock, means operated by the receiving member to wind the clock, and means on the selecting member for setting the indicating means, said release means acting to release said receiving member from said selecting member after the coin has passed from the receiving member to the selecting member whereby the selecting member can move free from any interference by further movement of the receiving member.

12. In a vending machine, a pressure member having therein a coin receiving slot, a selector member having thereon a coin selecting means adapted to receive the coin from the slot, each member having a forward and a rearward position, means to prevent the coin from passing from the slot to the selecting means until said members are in their rearward positions, lock means to cause said members to move together while said members are moved from their forward positions to their rearward positions, means to cause both members to move to their forward positions and means to release said lock means substantially upon the members attaining their rearward positions so that the two members will move to their forward positions independent of each other and whereby any inadvertent movement of the pressure member will not interfere with the movement of the selector member and the action of the coin selecting means.

13. In a vending machine, an indicating means, a clock for driving said means, a pressure member having therein a coin receiving slot, a selector member having thereon a coin selecting means, each member having a forward and a rearward position, means whereby the coin will pass from the slot to the selecting means when the members are in their rearward positions, lock means to cause said members to move together while said members are moved from their forward positions to their rearward positions, means to cause both members to move to their forward positions, means to release said lock means substantially upon the members attaining their rearward positions so that the two members will move to their forward positions independent of each other and whereby any inadvertent movement of the pressure member will not interfere with the movement of the selector member and the action of the coin selecting means thereon, means operated by the lock means on its being released to start said clock, means operated by the rearward movement of the pressure member for winding the clock, and means operated by the selector member as it moves forward to set the indicating means.

14. In a vending machine, an indicating means, a clock for driving said means, a coin selecting means adapted to receive coins, means to wind the clock, said third named means having a connection with the coin selecting means whereby the coin selecting means moves from a forward position to a rearward position as the clock is wound, means to move the coin selecting means from a rearward position to a forward position, means to break said connection and start the clock at the end of the winding operation, and means operated by the coin in the coin selecting means as it moves from its rearward position to its forward position for setting the indicating means.

15. In a vending machine, an indicating means, a clock for driving said means, a coin selecting means adapted to receive coins, means to wind the clock, means to prevent the over-winding of the clock, said third named means having a connection with the coin selecting means whereby the coin selecting means moves from a forward position to a rearward position as the clock is wound, means to move the coin selector means from a rearward position to a forward position, means to break said connection and start the clock at the end of the winding operation, and means operated by the selecting means as it moves forward from its rearward position for setting the indicating means.

CARL F. SISK.
JOHN B. MORTON, Jr.